(12) United States Patent
Kabe et al.

(10) Patent No.: US 6,462,796 B1
(45) Date of Patent: Oct. 8, 2002

(54) LIQUID CRYSTAL DISPLAY ELEMENT AND MANUFACTURING METHOD THEREOF

(75) Inventors: Masaaki Kabe, Kashiwa; Akira Sakaigawa, Kawasaki, both of (JP); Diana Cynthia Ulrich, Oxford (GB); Michael John Towler, Botley Oxford (GB); Paul Bonnett, Oxford (GB)

(73) Assignees: Sharp Kabushiki Kaisha, Osaka (JP); The Secretary for Defence in Her Britannic Majesty's Government of the United Kingdom of Great Britain and Northern Ireland, Hants (GB)

( * ) Notice: Subject to any disclaimer, the term of this patent is extended or adjusted under 35 U.S.C. 154(b) by 0 days.

(21) Appl. No.: 09/295,900

(22) Filed: Apr. 21, 1999

(30) Foreign Application Priority Data

Apr. 23, 1998  (JP) ............................................. 10-131193

(51) Int. Cl.[7] ............................................. G02F 1/1337
(52) U.S. Cl. ..................................... 349/124; 349/123
(58) Field of Search ............................... 349/123, 124, 349/133

(56) References Cited

U.S. PATENT DOCUMENTS

| | | | | |
|---|---|---|---|---|
| 3,904,797 A | | 9/1975 | Jones, Jr. et al. ................ 428/1 |
| 4,091,847 A | | 5/1978 | Sorkin ......................... 349/163 |
| 5,138,010 A | * | 8/1992 | Keller et al. ................... 528/26 |
| 5,539,553 A | * | 7/1996 | Tsukamoto et al. .......... 349/124 |
| 5,597,626 A | | 1/1997 | Eguchi ........................ 349/123 |
| 5,739,885 A | | 4/1998 | Mochizuki et al. .......... 349/133 |
| 5,812,230 A | | 9/1998 | Sakaigawa et al. .......... 349/166 |

FOREIGN PATENT DOCUMENTS

| | | |
|---|---|---|
| EP | 0 293 911 A2 | 12/1988 |
| EP | 0 353 760 A2 | 2/1990 |
| GB | 1364576 | 10/1972 |
| GB | 2 336 690 A * | 10/1999 |
| JP | 61-11724 * | 1/1986 |
| JP | 63163425 | 7/1988 |
| JP | 06194693 | 7/1994 |
| JP | 07181508 | 7/1995 |
| JP | 08245962 | 9/1996 |
| JP | 8-262446 * | 10/1996 |
| JP | 09043643 | 2/1997 |
| JP | 11-305234 * | 11/1999 |

OTHER PUBLICATIONS

Search Report dated Jul. 13, 1999.
Co–pending, commonly assigned U.S. patent application 09/066,105, filed Apr. 24, 1998.
E. Matsui, et al., Ferroelectric Liquid Crystal Displays with Analog Gray–Scale, Oct. 1996, pp. 191–192 (Partial only).
K. Naykaya, Electrooptic Bistability of a Ferroelectric Liquid Crystal Device Prepared Using Charge–Transfer Complex–Doped Polymide–Orientation Films, Jan. 1989, *Japanese Journal of Applied Physics*, vol. 28, No. 1, pp. L 116–L 118.

* cited by examiner

*Primary Examiner*—William L. Sikes
*Assistant Examiner*—Dung Nguyen
(74) *Attorney, Agent, or Firm*—Renner, Otto, Boisselle & Sklar, LLP

(57) ABSTRACT

A liquid crystal display element is formed by providing a liquid crystal layer made of ferroelectric liquid crystal material between electrode substrates. One of the electrode substrate is composed of a substrate, electrodes, an insulating film, and an alignment film, while the other substrate is composed of a substrate, electrodes, an insulating film, and an alignment plate. The alignment film is formed by mixing a substance with ionic bond in an alignment film material and thereafter applying the mixture on the paired substrates on each of which the electrodes and the insulating film are provided. With this arrangement, ions are eluted from the alignment films thus formed into the liquid crystal layer, thereby becoming dispersed therethrough homogeneously. This remarkably reduces influences of display history, and half-tone display with excellent response characteristics can be realized, being not affected by display history.

13 Claims, 14 Drawing Sheets

ION CURRENT

TIME

ION CURRENT

TIME

LIQUID CRYSTAL DISPLAY ELEMENT AND MANUFACTURING METHOD THEREOF

FIELD OF THE INVENTION

The present invention relates to a ferroelectric liquid crystal display element which realizes analog-type gray scale display, and a method for producing the same.

BACKGROUND OF THE INVENTION

Ferroelectric liquid crystal was first synthesized by R. B. Meyer in 1975. Thereafter, it was confirmed by N. A. Clark and S. T. Lagerwall that in the case where a gap between substrates provided vis-a-vis is narrowed, ferroelectric liquid crystal exhibits bistability.

Further, a variety of researches have been done on ferroelectric liquid crystal to seek for application of its utility, and consequently various display modes have been contrived. A typical one among them is a display mode in which liquid crystal material has positive dielectric anisotropy and is aligned in a C1 orientation. The C1 orientation refers to an alignment wherein liquid crystal molecules 22 are tilted at wider angles with respect to smectic layers 21 which are bent to form a chevron structure, as shown in FIG. 2(a).

A mode generally called τ-Vmin mode, in which liquid crystal material has negative dielectric anisotropy and is aligned in a C2 orientation, is also typical. The C2 orientation refers to an orientation, as shown in FIG. 2(b), wherein the liquid crystal molecules 22 are tilted at narrower angles with respect to the smectic layers 21 which are bent to form the chevron structure. This mode is characterized in that due to the C2 orientation, high response is easily realized as compared with the case of the C1 orientation, and that since the liquid crystal material has negative dielectric anisotropy, a memory angle is increased by a bias voltage.

In the foregoing two modes, since the liquid crystal molecules 22 basically exhibit binary bistability, only gray scale display with two gray levels (black and white) is obtained in display in the case where either of the modes is applied to a display device. Therefore, as to such a conventional display device, to increase the number of gray levels in gray scale was an object to be achieved. By using the frame division driving scheme, the pixel division scheme, or the like, the number of gray levels in gray scale can be increased to some extent, but to further increase the number of gray levels in gray scale is hardly possible because of limitations of the liquid crystal material and the device structure. Particularly to achieve the gray scale of 256 gray levels per one color of RGB which is required for full color display is extremely impossible.

Therefore, realization of the analog-type gray scale display in a ferroelectric liquid crystal display element has been demanded. To meet this demand, the following, for example, have conventionally been proposed: a method wherein analog-type gray scale display is realized by generating domains using as nuclei fine particles mixed in liquid crystal (see the Japanese Publication for Laid-Open Patent Application No. 194693/1994 (Tokukaihei 6-194693), date of publication: Jul. 15, 1994); and a method wherein analog-type gray scale display is realized by generating domains using polymers dispersed in liquid crystal (see the Japanese Publication for Laid-Open Patent Application No. 236830/1997 (Tokukaihei 9-236830), date of publication: Sep. 9, 1997, which corresponds to the U.S. patent application Ser. No. 09/066215).

In the case where these methods are applied to analog-type gray scale display, however, there arises a problem of display history that display of a current frame is affected by a state of a display of a previous frame. More specifically, in the case where signals of black data are continuously applied to pixels and thereafter signals of half tones are continuously applied to pixels, the intensity of light transmitted through pixels, supposing that display history would not exist, immediately changes from a black level to a half-tone level as shown in FIG. 15(a). In contrast, since display history exists in practice, as shown in FIG. 15(b), the intensity of the transmitted light does not immediately change to a half-tone level after application of half-tone data and gradually changes to reach the half-tone level after several frames.

Conventionally, such a scheme as using a conductive alignment film or shortening each frame time of a driving signal (The 22nd Japanese Liquid Crystal Conference, pp.191–192) has been preferably applied to solve the foregoing problem. There has been also proposed a scheme of giving conductivity to an alignment film by mixing a conductive substance therein (Japanese Journal of Applied Physics, Vol. 28, No. 1 January 1989, pp. L116–L118, date of publication: Dec. 15, 1988). This scheme, however, is used for enhancing the bistability of liquid crystal.

Incidentally, the following description will explain behaviors of ferroelectric liquid crystal in the case where an ionic substance is mixed in the ferroelectric liquid crystal.

Usually, mixture of an ionic substance in ferroelectric liquid crystal adversely affects characteristics of ferroelectric liquid crystal. For example, a burn-in phenomenon occurring to a display screen, and a uni-stable state, i.e., a state in which only one state of bistable states is stabilized, are induced. This is caused by accumulation of ions in liquid crystal. As a method for preventing such adverse influences of ions, there have been proposed a method of causing an alignment film to attract ionic substances (see the Japanese Publication for Laid-Open Patent Application No. 245962/1996 (Tokukaihei 8-245962), date of publication: Sep. 24, 1996) and a method of injecting ion-removed liquid crystal into an empty cell (see the Japanese Publication for Laid-Open Patent Application No. 181508/1995 (Tokukaihei 7-181508), date of publication: Jul. 21, 1995).

In some cases, ions enhance characteristics of ferroelectric liquid crystal. For example, in the case where ferroelectric liquid crystal is driven by TFTs (thin film transistors), mixture of ions produces an electrical double layer in the ferroelectric liquid crystal, which, without raising a signal voltage, prevents a voltage applied to the liquid crystal from lowering (see the Japanese Publication for Laid-Open Patent Application No. 43643/1997 (Tokukaihei 9-43643), date of publication: Feb. 14, 1997). In this method, liquid crystal is injected into a cell after ionic substances are directly mixed in the liquid crystal.

Actually, however, the problem of display history cannot be sufficiently solved by using a conductive alignment film or by shortening a frame time of a driving signal. Besides, by the method of mixing ions into liquid crystal before injection of the liquid crystal, ions are not homogeneously dispersed in the liquid crystal due to a chromatography phenomenon, whereby domains also do not become homogeneous. Therefore, this method cannot be effective to solve the problem of display history.

SUMMARY OF THE INVENTION

The object of the present invention is to provide a liquid crystal display element which is capable of forming fine domains in liquid crystal and drastically reducing influences of display history, as well as a method for producing the same.

To achieve the foregoing object, a liquid crystal display element of the present invention, which includes a pair of substrates with an insulating property on each of which electrodes are formed, an alignment film provided on at least one of the substrates so as to cover the electrodes thereon, and a liquid crystal layer made of a ferroelectric liquid crystal material sealed between the substrates, is characterized in that the alignment film contains a substance with ionic bond in the vicinity of the surface or inside thereof.

According to the foregoing arrangement, the alignment film contains the substance with ionic bond in the vicinity of its surface or inside. Therefore, ions are eluted from the alignment film into the liquid crystal layer, whereby ions are homogeneously dispersed in the liquid crystal layer. Therefore, during the half-tone display, fine domains are formed in the liquid crystal layer due to such ions, while influences of display history of a previous period are drastically reduced. In result, gray scale display with not less than two gray levels can be stably conducted.

Incidentally, cases meant by the description "the alignment film contains a substance with ionic bond in the vicinity of its surface or inside" include a case where the substance with ionic bond adheres to a surface of the alignment film.

A method of the present invention for producing a liquid crystal display element having a pair of substrates with an insulating property on each of which electrodes are formed, an alignment film provided on at least one of the substrates so as to cover the electrodes, and a liquid crystal layer made of a ferroelectric liquid crystal material sealed between the substrates is characterized by having the steps of (i) mixing a substance with ionic bond in an alignment film material for forming the alignment film, (ii) applying the alignment film material to at least one of the paired substrates so as to form the alignment film, and (iii) bonding the substrates to each other after the mixing and applying steps, and injecting the ferroelectric liquid crystal material between the bonded substrates.

By the foregoing method, since a substance with ionic bond is previously mixed in an alignment film material, the alignment film formed by application of the alignment film material to the substrates contains the substance with ionic bond. Therefore, this method enables production of a liquid crystal display element provided with an alignment film containing the substance with ionic bond, without complicated steps. Thus, it is possible to easily provide a liquid crystal display element whose gray scale display characteristics are remarkably improved.

Another method of the present invention for producing a liquid crystal element having a pair of substrates with an insulating property on each of which electrodes are formed, an alignment film provided at least on one of the substrates so as to cover the electrodes, and a liquid crystal layer made of a ferroelectric liquid crystal material sealed between the substrates is characterized by comprising the steps of (i) either soaking the substrates into a solution of a substance with ionic bond or applying the solution to the substrates, either before formation of the alignment film, after formation of the alignment film, or after application of an aligning operation with respect to the alignment film already formed, and (ii) bonding the substrates to each other after the forgoing step, and injecting the ferroelectric liquid crystal material between the bonded substrates.

By the foregoing method, since the substrates are soaked into a solution of a substance with ionic bond or the solution is applied to the substrates at any one of the foregoing stages, the substance with ionic bond is infiltrated into the alignment film already formed. This ensures that in the case where the substance with ionic bond is not contained in an alignment film material, the solution of the substance is applied to the alignment film through any step other than the alignment film formation step, resulting in that the substance with ionic bond is infiltrated into the formed alignment film. Therefore, by the method, without complicated steps, a liquid crystal display element with an alignment film which contains a substance with ionic bond in the vicinity of the surface or inside thereof can be produced simply by either soaking the substrates into the solution or applying the solution to the substrates at a desired stage. As a result, it is possible to provide a liquid crystal display device whose gray scale display characteristics are remarkably improved.

Furthermore, still another method of the present invention for producing a liquid crystal display element having a pair of substrates with an insulating property on each of which electrodes are formed, an alignment film provided on at least one of the substrates so as to cover the electrodes, and a liquid crystal layer made of a ferroelectric liquid crystal material sealed between the substrates is characterized by comprising the steps of (i) forming the alignment film on at least one of the paired substrates, and (ii) infiltrating a substance with ionic bond into the alignment film.

By the foregoing method, since a substance with ionic bond is infiltrated into an alignment film already formed, even if the substance with ionic bond is not previously contained in the alignment film, it is possible to produce a liquid crystal display element with an alignment film which contains a substance with ionic bond in the vicinity of the surface or inside thereof. Therefore, by the method, without complicated steps, a liquid crystal display element whose gray scale display characteristics are remarkably improved can be easily produced.

Furthermore, still another method of the present invention for producing a liquid crystal display element having a pair of substrates with an insulating property on each of which electrodes are formed, an alignment film provided on at least one of the substrates so as to cover the electrodes, and a liquid crystal layer made of a ferroelectric liquid crystal material sealed between the substrates is characterized by comprising the steps of (i) infiltrating a substance with ionic bond into the substrates and (ii) forming an alignment film on at least one of the paired substrates.

By the foregoing method, since an alignment film is formed on the substrates into which a substance with ionic bond is infiltrated, it is possible to produce a liquid crystal display element with an alignment film which contains a substance with ionic bond in the vicinity of the surface or inside thereof, if the substance with ionic bond is not previously contained in the alignment film. Therefore, by the method, without complicated steps, a liquid crystal display element whose gray scale display characteristics are remarkably improved can be easily produced.

For a fuller understanding of the nature and advantages of the invention, reference should be made to the ensuing detailed description taken in conjunction with the accompanying drawings.

DESCRIPTION OF THE PREFERRED EMBODIMENTS

Referring to FIGS. 1, 2(a) and 2(b), 3(a) through 3(c), 4(a) and 4(b), 5, 6(a) and 6(b), 7 through 9, 10(a) through 10(c), and 11 through 14, the following description will discuss an embodiment of a present invention.

Figure 1:
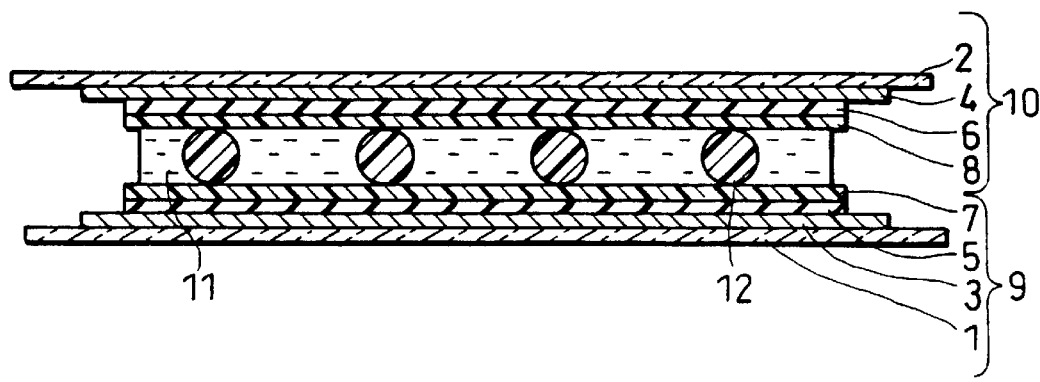
FIG. 1 is a cross-sectional view illustrating an arrangement of a liquid crystal cell in accordance with an embodiment of the present invention.
Figure 2A:
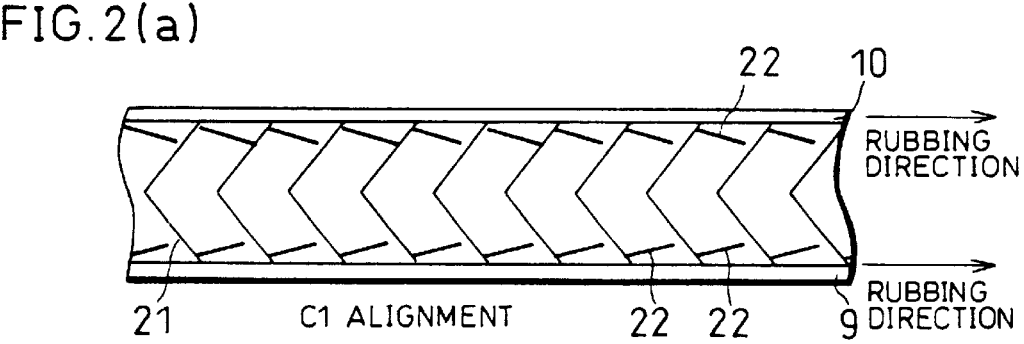
FIG. 2(a) is an explanatory view illustrating a liquid crystal layer in the liquid crystal cell shown in FIG. 1 or a usual liquid crystal cell, the liquid crystal layer being aligned in C1 orientation.
Figure 2B:
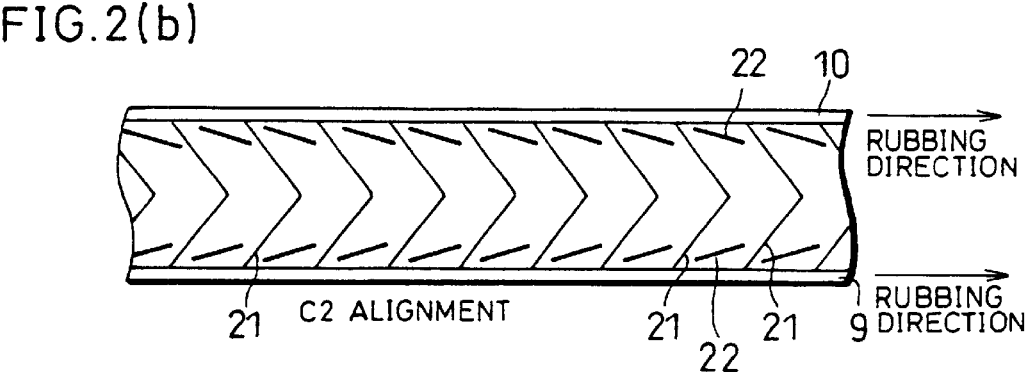
FIG. 2(b) is an explanatory view illustrating a liquid crystal layer aligned in C2 orientation.
Figure 3A:
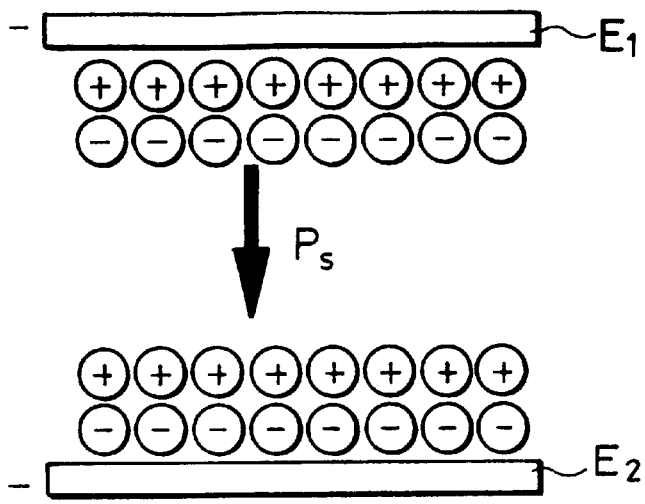
FIGS. 3(a) through 3(c) are schematic views illustrating behaviors of an electrical double layer formed by ions, which explain a reason why ions reduce influences of display history.
Figure 3B:
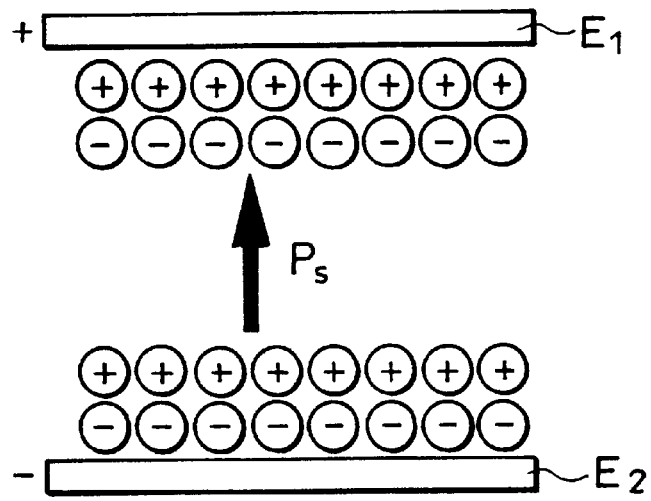
Figure 3C:
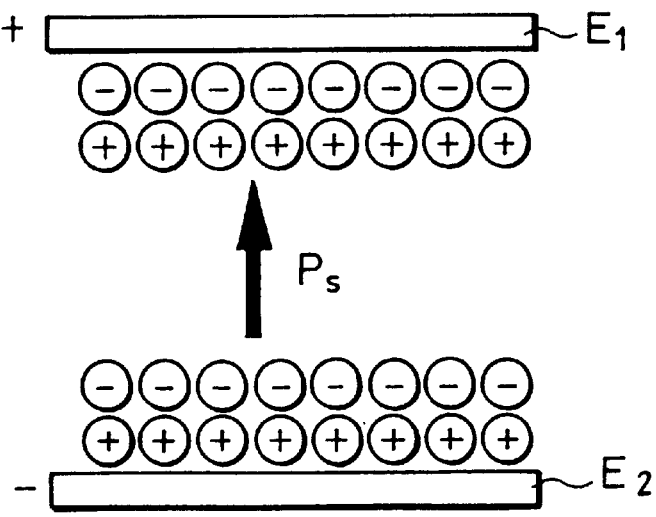

The liquid crystal display element (hereinafter, referred to as the liquid crystal cell) of the present embodiment has a structure as illustrated in FIG. 1. The liquid crystal cell is provided with two substrates 1 and 2 that have a light-transmitting property and an insulating property. The substrates 1 and 2 are normally made of glass substrates having a high light-transmitting property.

Electrodes 3 and 4, each of which is made of a transparent conductive film, are formed on the respective surfaces of the substrates 1 and 2. The electrodes 3 and 4 are formed by using materials, such as $InO_3$, $SnO_2$, and ITO (Indium Tin Oxide), that are formed into a predetermined pattern by the CVD (Chemical Vapor Deposition) method or the sputtering method.

Transparent insulating films 5 and 6 are formed on the respective electrodes 3 and 4. Inorganic thin films made of materials such as $SiO_2$, $SiN_x$, $Al_2O_3$, and $Ta_2O_5$, or organic thin films made of materials such as polyimide, photoresist resin and high molecular liquid crystal, are used as the insulating films 5 and 6.

The insulating films 5 and 6, when made of inorganic thin films, are formed by methods such as the vapor deposition method, the sputtering method, the CVD method and the solution-applying method. On the other hand, the insulating films 5 and 6, when made of organic thin films, are formed by applying a solution of an organic substance or its precursor using the spinner coating method, the dip coating method, the screen printing method, the roll coating method or other methods, and by curing the solution under predetermined setting conditions (heat, light irradiation, etc.). Further, the formation of the insulating films 5 and 6 made of organic thin films may also be carried out by the vapor deposition method, the sputtering method, the CVD method, the LB (Langumuir-Blodgett) method or other methods.

Alignment films 7 and 8 are formed on the insulating films 5 and 6. The alignment films 7 and 8 made of organic thin films are formed by using materials such as nylon (polyamide), polyvinyl alcohol, or polyimide, and rubbing (uniaxial alignment treatment) is normally applied to the surface thereof. The alignment films 7 and 8 are preferably made of polyimide. As a method for forming the alignment films 7 and 8 made of polyimide, a method of applying a soluble polyimide solution and thereafter annealing the same is preferable, since a superior charge maintaining property is obtained by the method and an annealing temperature for the method is low. Incidentally, alignment films made of inorganic materials such as SiO or the like, which are formed by an oblique evaporation method, may be used in the place of the foregoing organic alignment films 7 and 8.

Polarizing plates, not shown, are formed on the other respective surfaces than the surfaces of the substrates 1 and 2 having the electrodes 3 and 4. The polarizing plates are installed so as to optically recognize the switchover of optical axes of the liquid crystal that occurs when voltage is selectively applied to the electrodes 3 and 4.

An electrode substrate 9 is constituted by the above-mentioned substrate 1, the electrode 3, the insulating film 5, the alignment film 7 and the polarizing plate. On the other hand, an electrode substrate 10 is constituted by the above-mentioned substrate 2, the electrode 4, the insulating film 6, the alignment film 8 and the polarizing plate.

The electrode substrates 9 and 10 are bonded to each other through sealing material (not shown) in a manner so as to face at a predetermined distance from each other and so that the alignment of the alignment films 7 and 8 are directed in the same direction. The space, formed between the electrode substrates 9 and 10, is filled with a mixture containing a ferroelectric liquid crystal material (hereinafter referred to as FLC material), whereby a liquid crystal layer 11 is formed.

To keep a thickness (cell gap) of the liquid crystal layer 11 uniform, spherical spacers 12 are provided between the electrode substrates 9 and 10. The diameter of the spacers 12 is 1 to 30 μm, or preferably, 1 to 5 μm.

In order to arrange a plurality of pixels in a liquid crystal cell of the present embodiment, the plural electrodes (row electrodes) 3 are aligned in parallel with one another in the row direction, and the plural electrodes (column electrodes) 4 are also aligned in parallel with one another in the column direction in a manner so as to orthogonally intersect the electrodes 3. With the electrode arrangement having such a matrix form, a pixel is formed at each portion at which the electrode 3 and the electrode 4 intersect each other. Thus, each pixel has a construction in which the liquid crystal layer 11 is sandwiched by the electrodes 3 and 4. Therefore, a number of pixels are formed by installing a number of the electrodes 3 and 4, which makes it possible to provide display with a large capacity.

The electrodes 3 are connected to a row-electrode driver (not shown), and the electrodes 4 are connected to a column-electrode driver (not shown). The row-electrode driver successively applies to the electrodes 3 selection voltages (column voltages) for selecting the electrodes 3. On the other hand, the column-electrode driver applies to the electrodes 4 voltages (row voltages) for switching the operational states of the liquid crystal layer 11.

Pulse voltages are applied to the liquid crystal layer 11 by the row-electrode driver and the column-electrode driver. The pulse voltages are allowed to have desired rectangular waveforms in which the width (duration) and the height (voltage level) are variable, by combining the row voltage and the column voltage.

Incidentally, a substance with ionic bond is mixed in the alignment films 7 and 8 in advance. Mixing of the substance with ionic bond may be carried out, either at a stage in which the alignment films 7 and 8 are an alignment film material yet before formation as films, or at a stage after the formation of the alignment films 7 and 8 but before a rubbing operation is applied, or at a stage after a rubbing operation is applied to the alignment films 7 and 8.

The substance with ionic bond is not particularly limited, and it may be anything provided that it is solved in the FLC material thereby being dissolved into ions, but a salt made of an organic acid and an organic base is preferable, or tetrabutylammonium trifluoromethanesulfonate is especially preferable to be used as the substance with ionic bond. Further, pyridine trifluoromethanesulfonate is also particularly preferable. Incidentally, charge-transfer complexes are not substances solved in the FLC material to be dissolved into ions.

A quantity of the substance with ionic bond is preferably not less than 0.1 percent by weight (wt %), more preferably not less than 0.2 wt %, or most preferably not less than 0.5 wt % with respect to the FLC material, since the larger the quantity of the substance with ionic bond is, the smaller the influence of display history is. In addition, a quantity of the substance with ionic bond is preferably not more than 5 wt %, or more preferably not more than 3 wt % with respect to the FLC material.

By mixing the substance with ionic bond into the alignment films 7 and 8 as described above, the following effect can be achieved.

In the case where an ionic substance, as in the prior art, is mixed in liquid crystal before injection of liquid crystal, ions are not homogeneously dispersed due to a chromatography phenomenon. On the other hand, it is considered that the chromatography phenomenon hardly takes place in the alignment films 7 and 8, since a substance with ionic bond is previously mixed therein as described above and the ions are solved into the FLC material from the portions of the films 7 and 8 brought into contact with the FLC material when the FLC material is injected between the electrode substrates 9 and 10. Therefore, the ions are homogeneously dispersed in the liquid crystal layer 11, whereby influences of display history are drastically reduced. As a result, gray scale display with not less than two gray levels can be stably conducted.

The reason why ions reduce influences of display history can be considered to be as follows. As shown in FIG. 3($a$), ions (indicated by "+" and "−" in the figure) form electrical double layers in the vicinity of interfaces to the electrodes $E_1$ and $E_2$. When a switchover of the liquid crystal molecules from this state takes place, a direction of spontaneous polarization Ps reverses as shown in FIG. 3($b$). Thereafter, as shown in FIG. 3($c$), each electrical double layer reverses at substantially the same speed as the reversing speed of the spontaneous polarization Ps. Thus, this quick reversion of the electrical double layer stabilizes the spontaneous polarization Ps, thereby reducing influences of display history.

The FLC material used in the present embodiment exhibits negative dielectric anisotropy, and exhibits a voltage vs. memory-pulse width characteristic which has a minimum value, upon application of a pulse voltage. The pulse voltage, applied at this time, is a voltage which has a waveform with different polarities at predetermined intervals.

The FLC material, which exhibits the above-mentioned characteristic, is allowed to select a switched state on the low-voltage side and also to select a non-switched state on the high voltage side, on condition that the pulse width is made constant. With this arrangement, the higher the voltage is, the higher degree of stability in the non-switched state, i.e., in the holding state is obtained, resulting in that it becomes possible to reduce fluctuations in liquid crystal molecules to a great degree. Therefore, use of the above-mentioned FLC material ensures reduction of leakage of light.

In contrast, in a commonly used FLC material, the pulse width varies virtually in inverse proportion to the voltage, thereby exhibiting a voltage vs. memory-pulse width characteristic which does not have a minimum value. Therefore, such an FLC material is only allowed to select a non-switched state on the low-voltage side and to select a switched state on the high-voltage side, on condition that the pulse width is made constant. The non-switched state on the low-voltage side tends to cause fluctuations in liquid crystal molecules, thereby resulting in an increased leakage of light and degradation in contrast.

Further, as illustrated in FIGS. 2($a$) and 2($b$), the FLC composition used in the present embodiment has a chevron structure wherein the smectic layers 21 are bent at their center portions between the electrode substrates 9 and 10. Such a chevron structure includes C1 orientation wherein the bends take place in a direction opposite to the rubbing direction and C2 orientation wherein the bends take place in the same direction as the rubbing direction. The C1 orientation and the C2 orientation are obtained by achieving agreement of the rubbing directions of the electrode substrates 9 and 10 with each other.

In the case of C1 orientation, liquid crystal molecules 22 in the vicinity of the electrode substrates 9 and 10 tend to easily move since they are hardly affected by the interfaces between the electrode substrates 9·10 and the smectic layers 21. For this reason, since liquid crystal molecules 22 in the smectic layers 21 all move, switching delay tends to occur.

In contrast, in the case of C2 orientation, liquid crystal molecules 22 in the vicinity of the electrode substrates 9 and 10 never move, or hardly move, since they are affected by the interfaces between the electrode substrates 9·10 and the smectic layers 21. For this reason, in the smectic layers 21, only the liquid crystal molecules 22 that are located at portions except for the portions in the vicinity of the interfaces move; therefore, it is possible to increase the switching speed as compared with the case of C1 orientation.

Thus, in the present liquid crystal cell, it is preferable for the smectic layers 21 to have C2 orientation in a unified manner. Further, a pre-tilt angle is imparted to the liquid crystal molecules 22 so that each liquid crystal molecule 22 tilts at narrower angles with respect to the smectic layers 21 which are bent to form chevron structure in C2 orientation.

Figure 4A:
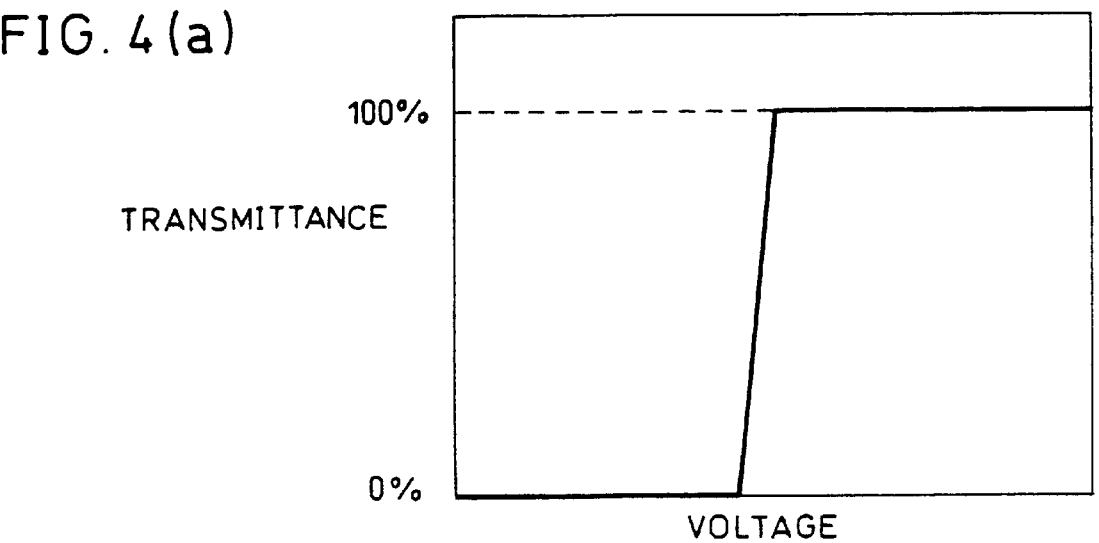
FIG. 4(a) is a graph showing a voltage vs. transmittance characteristic of usual ferroelectric liquid crystal.
Figure 4B:
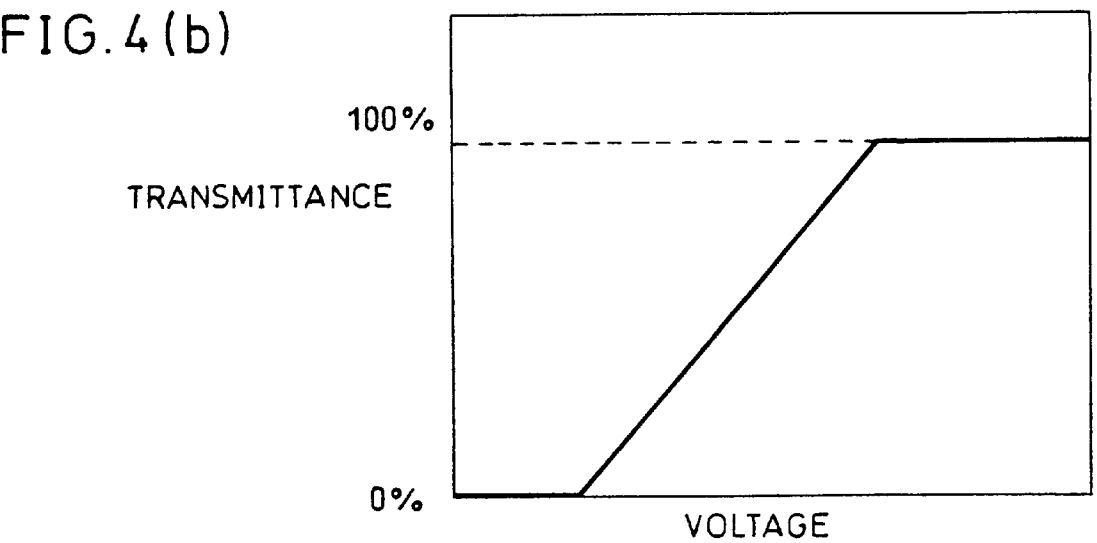
FIG. 4(b) is a graph showing a voltage vs. transmittance characteristic of ferroelectric liquid crystal used for forming the foregoing liquid crystal cell.

A usual FLC material exhibits an abrupt threshold characteristic as shown in FIG. 4(a), but by using an FLC material which exhibits a gradual threshold characteristic as shown in FIG. 4(b), finer domains can be obtained.

Incidentally, the gradual threshold characteristic indicates a threshold characteristic that maximum of a voltage (threshold voltage width) required for changing the transmittance from 10 percent to 90 percent is not less than 1.5 V.

The FLC material having such a gradual threshold characteristic can be easily obtained by making a usual FLC material contain a polymer or fine particles. It is considered that switchings take place around the added polymer or fine particles as nuclei, whereby further finer domains are generated.

Preferably used as the foregoing polymer is a polymer disclosed in the Japanese Publication for Laid-Open Patent Application No. 236830/1997 (Tokukaihei 9-236830, which corresponds to the U.S. patent application Ser. No. 09/066, 215), which is obtained by polymerizing photo-polymerizable monomers having a structure expressed by the formula (1) below:

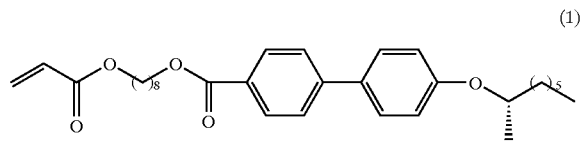

(1)

Particles of carbon black, titanium oxide, or the like are used as the foregoing fine particles, but particles of amorphous titanium oxide with a diameter of about 20 nm each are particularly preferable. It is preferable that the foregoing fine particles are in a state of primary fine particles non-aggregated, and has a diameter not more than half the liquid crystal cell gap. Furthermore, the foregoing fine particles preferably have a diameter of not greater than 400 nm, and particularly preferably have a diameter of not greater than 100 nm, which means being ultrafine powder.

Incidentally, the FLC material used in the present embodiment may be a material which exhibits positive dielectric anisotropy. The alignment state of the liquid crystal layer 11 is not limited to the state of the C2 orientation, and the orientation may be any one selected from among the C1 orientation, a book shelf orientation, and an oblique orientation.

The following description will explain examples of the present invention.

EXAMPLE 1

A liquid crystal of the present example was produced in the following manner.

First, the electrodes 3 and 4 made of ITO were formed on the substrates 1 and 2, respectively, to a thickness of 1000 Å each, and the insulating films 5 and 6 (trade name: A-2014, produced by the Nissan Chemical Industries, Ltd.) made of $SiO_2$ were formed by spin coating to a thickness of 700 Å each. For the formation of the insulating films 5 and 6, the substrates 1 and 2 were coated with an insulating-film-use solution by spin coating, and thereafter, the coated substrates 1 and 2 were subjected to prebaking on a hot plate at a temperature of 60° C. for 3 minutes, then main baking at a temperature of 200° C. for 90 minutes. Further, the substrates 1 and 2 were subjected to supersonic washing with use of neutral detergent.

Subsequently, an alignment film material made of polyimide was applied on the insulating films 5 and 6 to a thickness of 500 Å each, whereby the alignment films 7 and 8 were formed. Thereafter, a rubbing operation was applied to surfaces of the alignment films 7 and 8, and the electrode substrates 9 and 10 were obtained.

In the formation of the alignment films 7 and 8, three types of mixture solutions were obtained by mixing by stirring tetrabutylammonium trifluoromethanesulfonate (hereinafter referred to as TBATFMS) which is a substance with ionic bond into a soluble polyimide alignment-film-use solution so that TBATFMS accounted for 1.0 wt %, 0.5 wt %, and 0.2 wt %, respectively. The three types of mixture solutions were applied to the insulating films 5 and 6 by spin coating, and thereafter, prebaking was carried out on a hot plate at a temperature of 80° C. for 3 minutes, and main baking, at a temperature of 180° C. for 90 minutes.

Subsequently, a rubbing operation was conducted with respect to the alignment films 7 and 8 under the following conditions:

diameter of rubbing roller: 150 mm rotation of rubbing roller: 500 rpm stage moving speed (moving speed of alignment films 7, 8): 10 mm/s repetition of rubbing operation: 3 times pushing depth of rubbing cloth: 0.2 mm After the rubbing operation, cleaning was carried out by spraying nitrogen on the alignment films 7 and 8.

Subsequently, spacers 12 with a diameter of 1.4 μm each were scattered on the alignment films 7 and 8, and the electrode substrates 9 and 10 were bonded with a sealing material applied to the peripheries of the substrates 9 and 10, in a manner such that the respective rubbing directions of the alignment films 7 and 8 agree with each other.

By so doing, first to third cells were formed with the soluble polyimide alignment-film-use solution in which contents (ion quantity) of the substance with ionic bond were 1.0 wt %, 0.5 wt %, and 0.2 wt %, respectively.

Then, an FLC material which phase-shifts at the following temperatures and which has negative dielectric anisot ropy was injected in the first to third cells, and the entire liquid crystal layer 11 was aligned in the C2 orientations.

$$\text{isotropic phase} \xrightarrow{(105°\text{C.})} \text{N* phase} \xrightarrow{(94°\text{C.})} \text{SmA phase} \xrightarrow{(74°\text{C.})} \text{SmC* phase}$$

Figure 5:
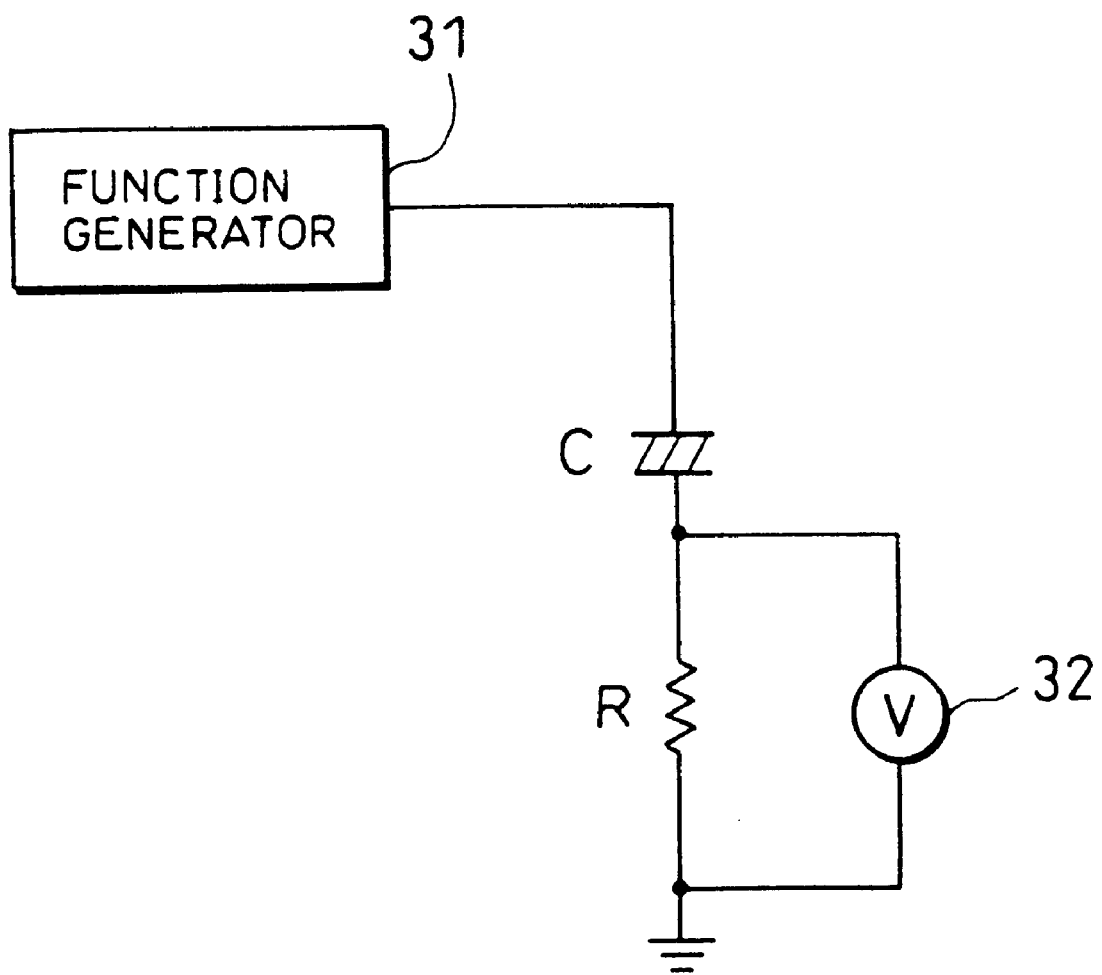
FIG. 5 is a circuit diagram illustrating an arrangement of a measurement device for measuring ion current flowing through the liquid crystal cell in accordance with Example 1 of the foregoing embodiment.

Then, the first cell (TBATFMS: 1.0 wt %) and a comparative cell which was arranged in the same manner as that for the first cell except that TBATFMS was not mixed in the alignment films 7 and 8 were prepared, and ion current was measured by a measurement circuit shown in FIG. 5. The measurement circuit carried out the measurement in the following manner: a function (waveform) generated by a function generator 31 was applied to a test cell C (capacitor), and ion current flowing through the test cell C was converted into a voltage by a resistor R, which was measured by a voltmeter 32 connected with the resistor R in parallel. The measurement conditions were set as follows. The waveform generated by the function generator 31 was a square waveform with a frequency of 1 kHz and with an amplitude of ±10 V. A resistance of the resistor R was 200 Ω, while the ambient temperature was set to 30° C.

Figure 6A:
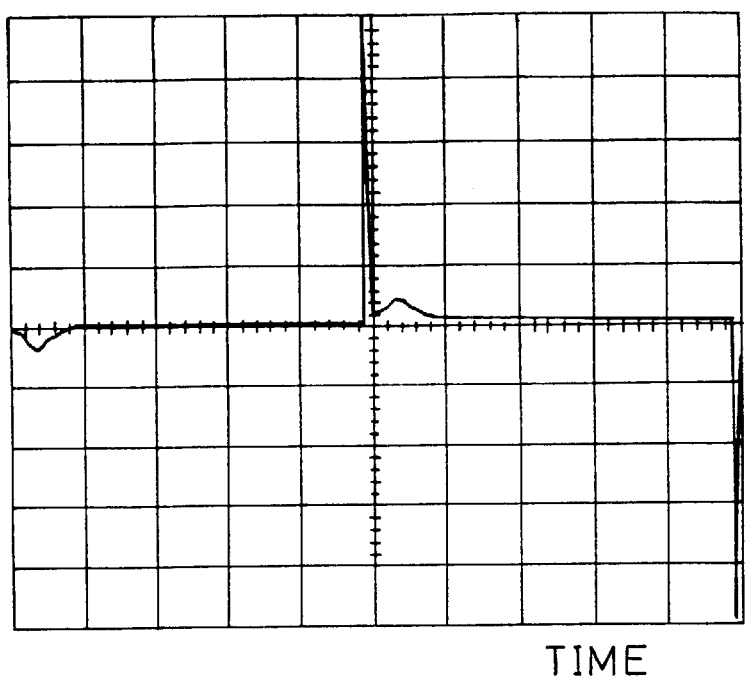
FIG. 6(a) is a graph illustrating change of ion current flowing through a cell whose alignment film does not contain TBATFMS.
Figure 6B:
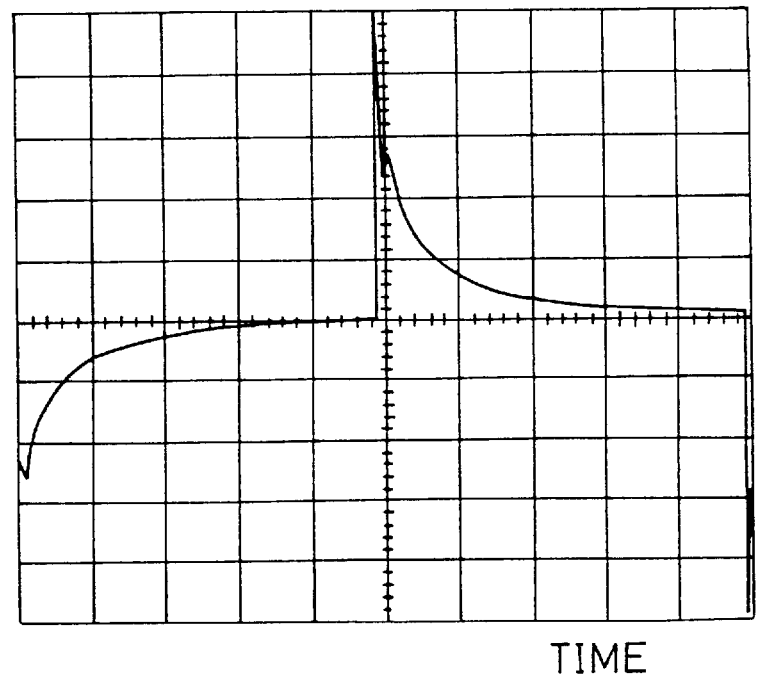
FIG. 6(b) is a graph illustrating change of ion current flowing through the liquid crystal cell in accordance with Example 1 whose alignment film contains TBATFMS.

In result, as shown in FIG. 6(a), no ion current, other than slight current which reverses the spontaneous polarization (Ps), flew through the comparative cell as the test cell C. On the other hand, ion current flowing through the first cell as the test cell C remarkably increased particularly at about a timing of a peak of the spontaneous polarization, as shown in FIG. 6(b). This shows that since the FLC material was injected into the cell after formation therein of the alignment films 7 and 8 in which a substance with ionic bond had been mixed, ions were solved into the liquid crystal layer 11.

Figure 7:
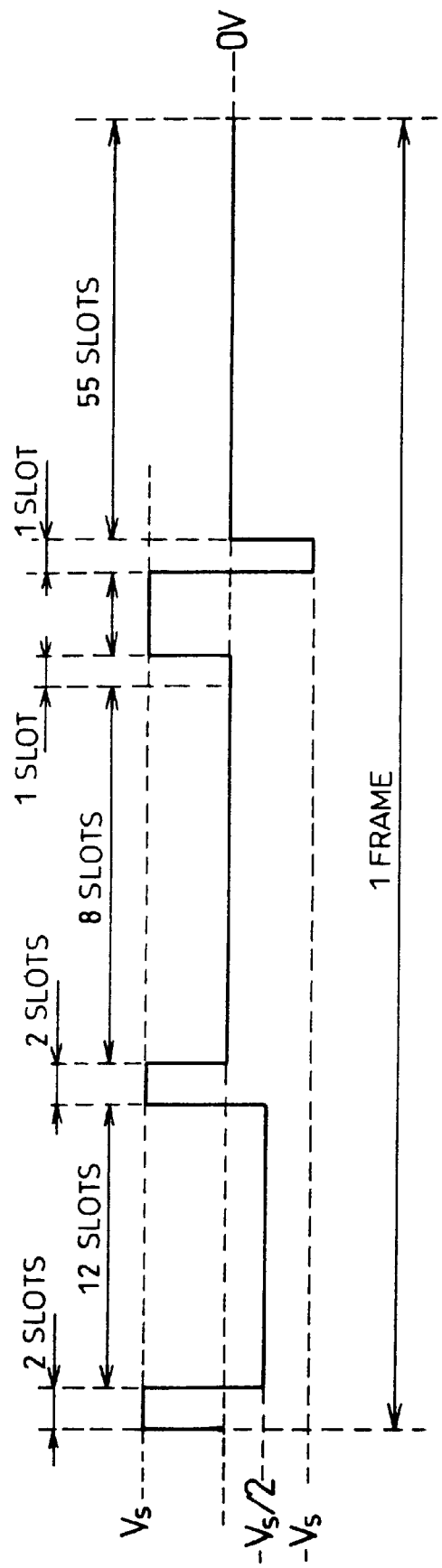
FIG. 7 is a waveform chart showing a waveform of a strobe signal applied to respective liquid crystal cells in accordance with Examples 1 and 3.
Figure 8:
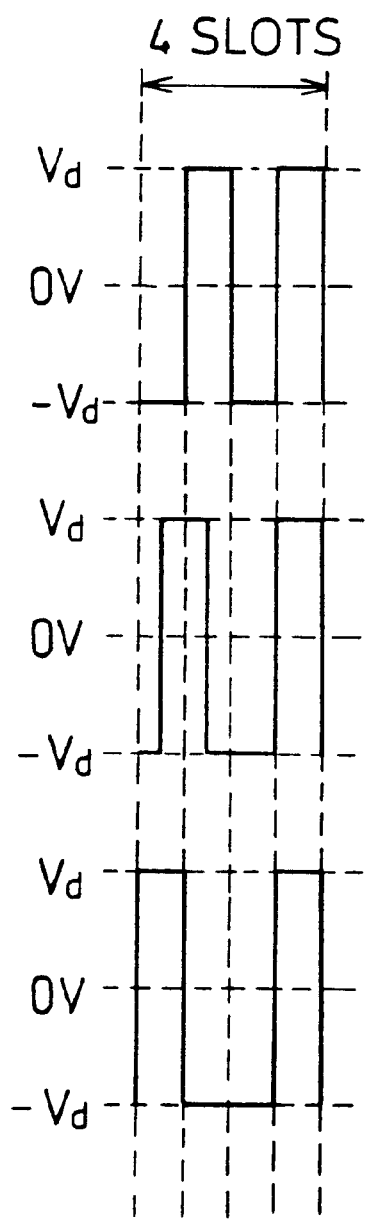
FIG. 8 is a waveform chart showing a waveform of a data signal applied to the liquid crystal cells in accordance with Examples 1 and 3.

Then, a strobe signal in a waveform shown in FIG. 7 was applied to either the substrate 9 or 10 of each of the first through third cells, while a data signal in a waveform shown in FIG. 8 was simultaneously applied as well. The strobe signal was formed by providing a positively polarized pulse with a voltage level of Vs, a negatively polarized pulse with a voltage level of −Vs/2, a negatively polarized pulse with a voltage level of −Vs, and a 0 level in one frame.

The data signal was a square pulse whose maximum voltage and minimum voltage were Vd and −Vd, respectively, as shown in FIG. 8. FIG. 8 shows only a waveform of the data signal for 4 slots (one line address period), which is a basic waveform of the data signal, but the data signal with such a waveform was always applied during the entire frame duration.

This data signal has pulses whose phases are fixed at the fourth slot but vary in accordance with gray levels at the first and second slots in the former half of the basic waveform, so that they are balanced in DC terms during one line address period. In other words, with this data signal, gray levels can be expressed by pulse phases in the former half.

Figure 9:
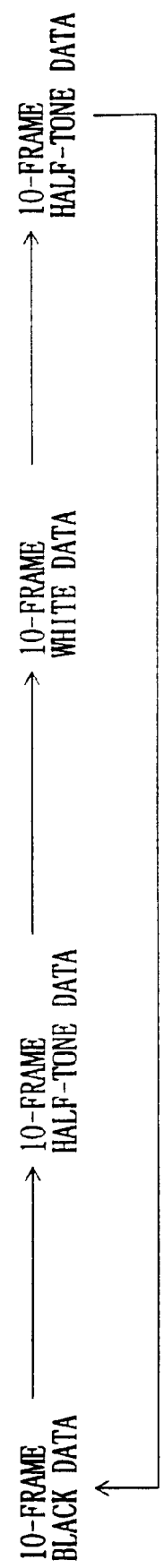
FIG. 9 is an explanatory view illustrating a variation pattern of the data signal applied to the liquid crystal cell in accordance with Example 1.

As shown in FIG. 9, one set of black data, half-tone data (transparency of 50%), white data, and half-tone data was repeatedly applied as a data signal.

Figure 10B:
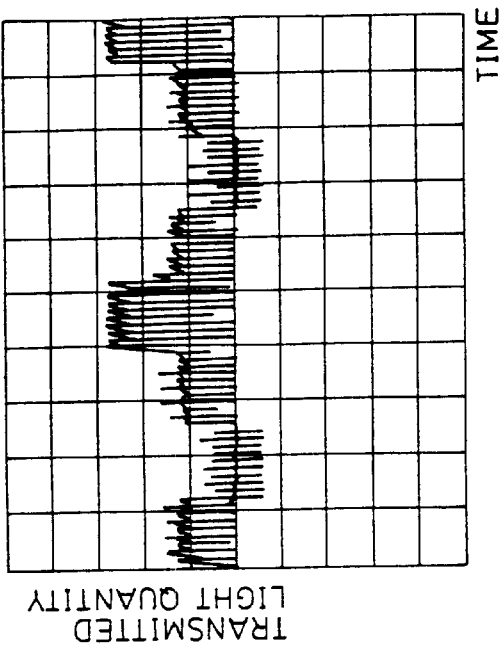
FIGS. 10(a) through 10(c) are graphs illustrating optical response characteristics of liquid crystal cells of three types in accordance with Example 1.
Figure 10A:
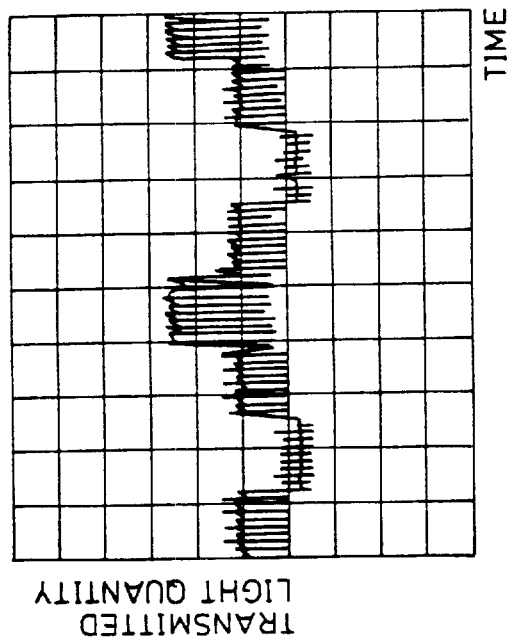
Figure 10C:
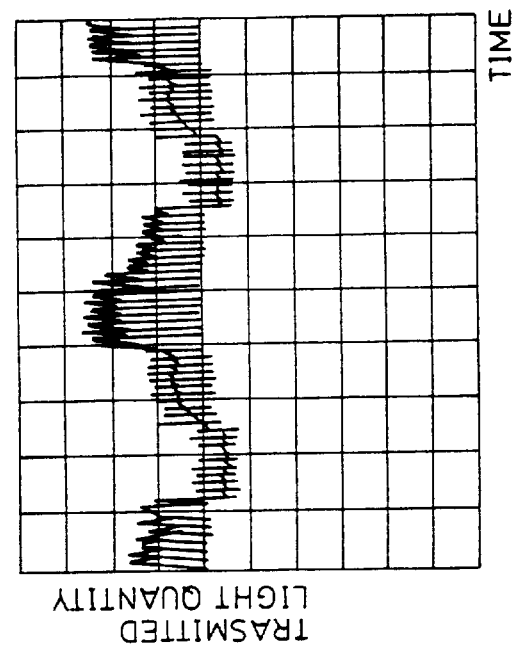

Variation of quantities of light transmitted through the first, second, and third cells herein are shown in FIGS. 10(a) through 10(c), respectively. Conditions in the transmitted light quantity measurement were as follows: slot time and Vd were 4.57 μs and 3 V, respectively, common to the first through third cells, while Vs was set to 37.7 V for the first cell, 44.7 V for the second cell, and 42.3 V for the third cell.

Figure 11:
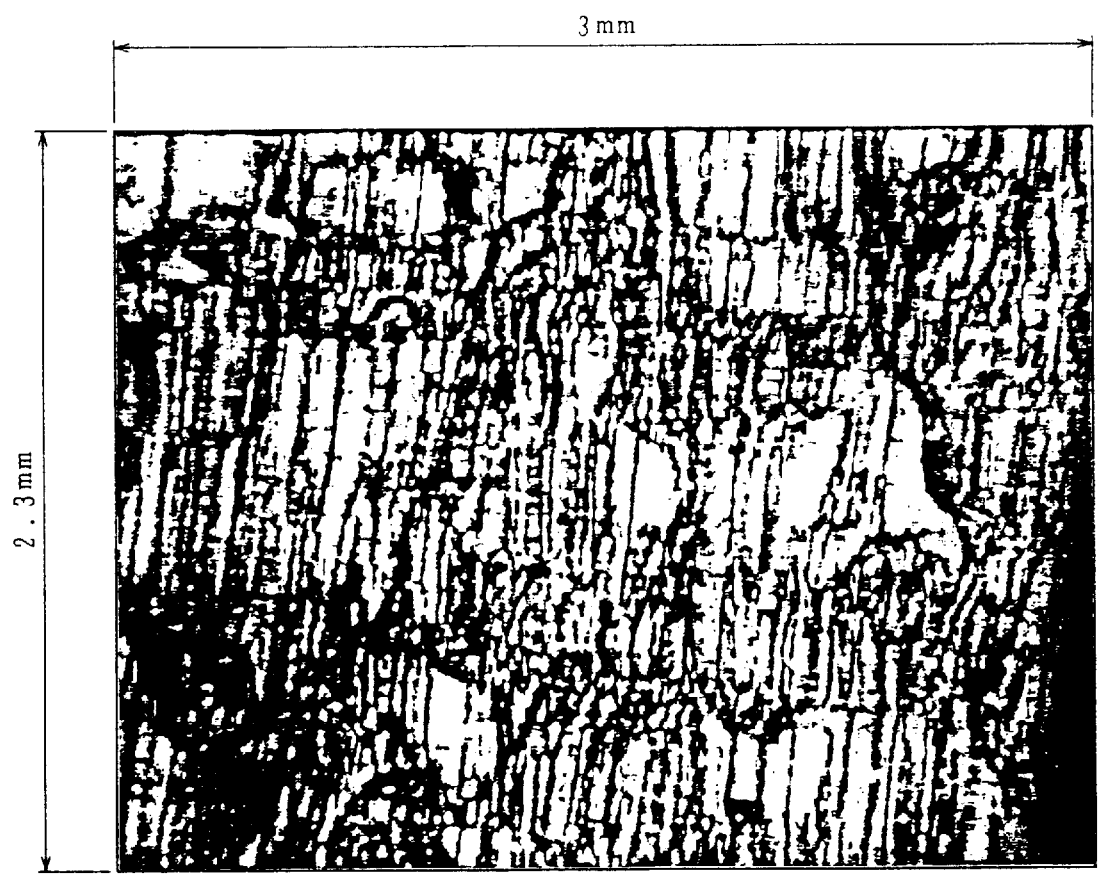
FIG. 11 is a photographic drawing illustrating domains appearing in the liquid crystal cell in accordance with Example 1, which are displayed as a halftone image on a display screen.

The transmitted light quantity variation in the case of the first cell was, as shown in FIG. 10(a), characterized in that display during a period while half-tone data were displayed was not affected by display history of a previous period. Besides, intensity of the transmitted light in the half-tone state varies with variation of a voltage of the strobe signal. Therefore, gray scale display of not less than two gray levels, particularly gray scale display of not less than three gray levels, can be stably carried out. Furthermore, in the half-tone state, as shown in FIG. 11, emergence of sufficiently fine domains (a maximum size of about 50 μm) was confirmed.

On the other hand, in the case of the second cell, as shown in FIG. 10(b), display was slightly affected by display history of the previous period, while in the case of the third cell, as shown in FIG. 10(c), display was more affected by display history of the previous period, as compared with the case of the second cell. This illustrates that the more TBATFMS a cell contained, the less the display of the cell was affected by display history of the previous period.

Furthermore, in the case where the data signal variation pattern was repetition of black data and white data (in the case of gray scale display with two gray levels), to mix a substance with ionic bond is effective to reduce influence of display history.

Figure 12:
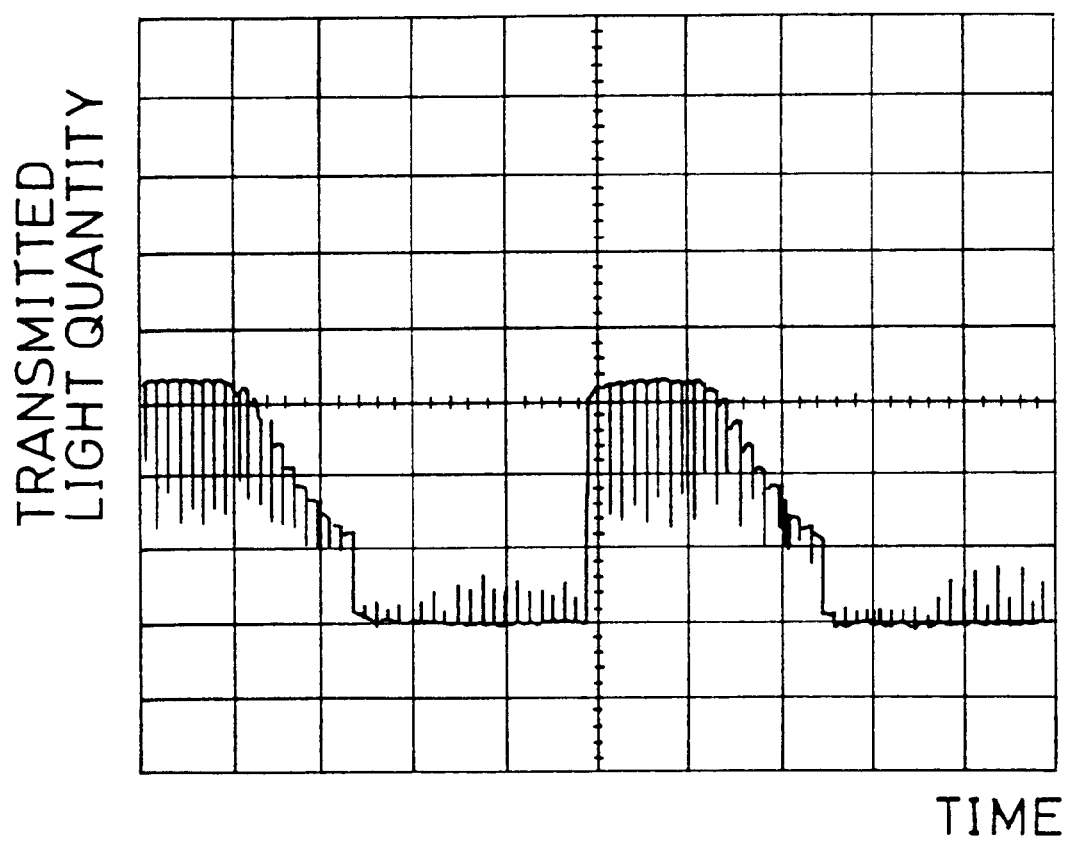
FIG. 12 is a graph illustrating an optical response characteristic of a liquid crystal cell in accordance with Comparative Example with respect to Example 1.

Here, transmitted light quantity variation in the case where the aforementioned strobe signal and data signal were applied to the comparative cell is shown in FIG. 12. This figure makes it clear that display during a period while half-tone data were displayed was greatly affected by display history of the previous period.

As described above, in the present example, by mixing a substance with ionic bond into the alignment films 7 and 8, ions are homogeneously dispersed in the liquid crystal layer 11. This drastically reduces influence of display history, resulting in that gray scale display with not less than two gray levels can be stably conducted.

EXAMPLE 2

The following description will explain a modification of the example 1.

A liquid crystal cell in accordance with the present example was produced by injecting a mixture obtained by adding to the FLC material a polymer of 0.1 wt % with respect to the weight of the FLC material or fine particles of 2 wt % with respect to the weight of the FLC material to that sealed in the foregoing first cell, into an empty cell (cell before injection of liquid crystal material) identical to the first cell.

A polymer which is obtained by polymerizing photopolymerizable monomers expressed by the aforementioned formula (1) is suitable as the foregoing polymer, while particles of amorphous titanium oxide with a diameter of about 20 nm is suitable as the foregoing fine particles.

Figure 13:
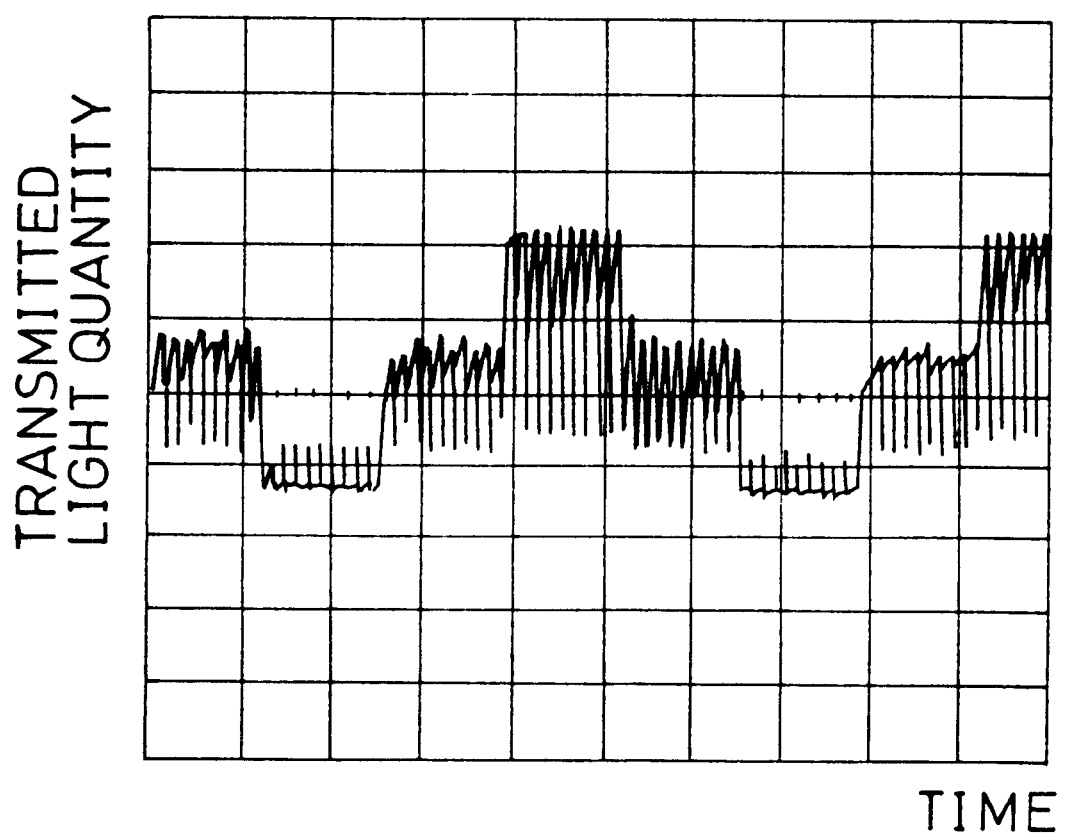
FIG. 13 is a graph illustrating an optical response characteristic of a liquid crystal cell (fourth cell) containing polymer or fine particles in accordance with Example 2.
Figure 14:
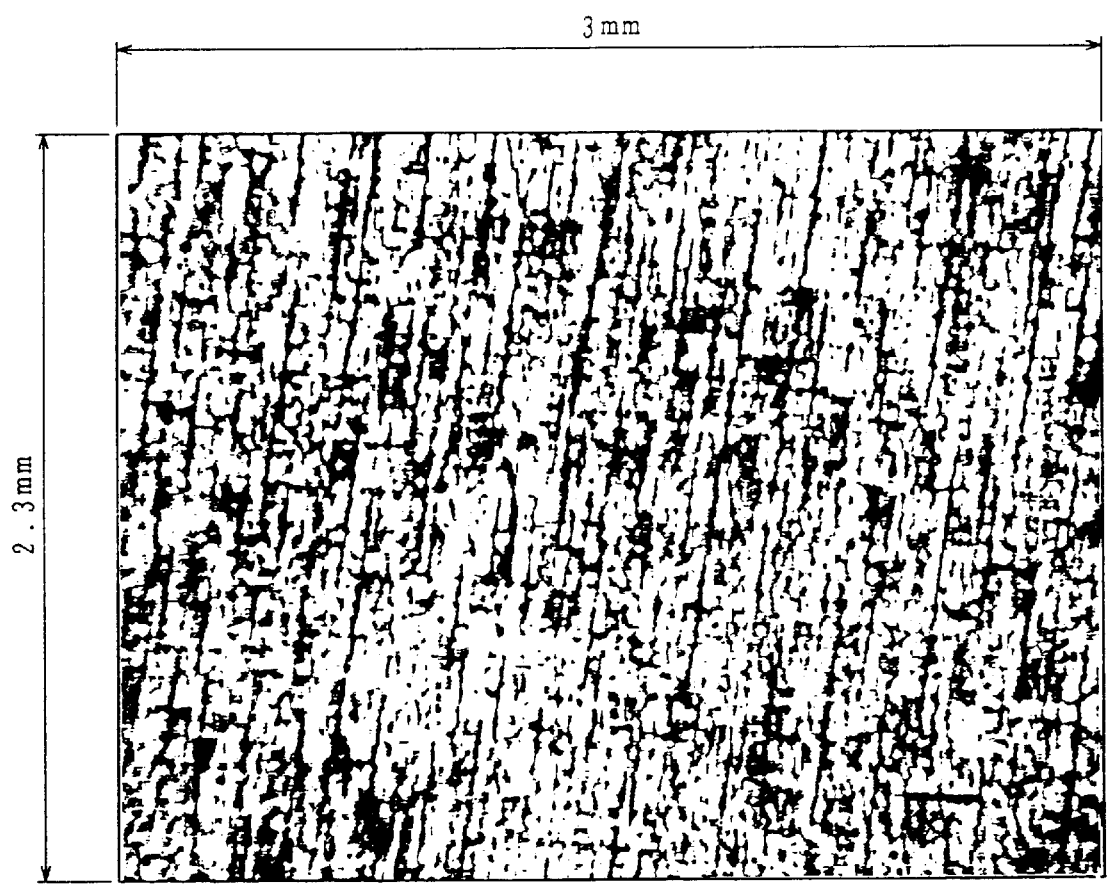
FIG. 14 is a photographic drawing illustrating domains appearing in the fourth cell, which are displayed as a half-tone image on a display screen.
Figure 15A:
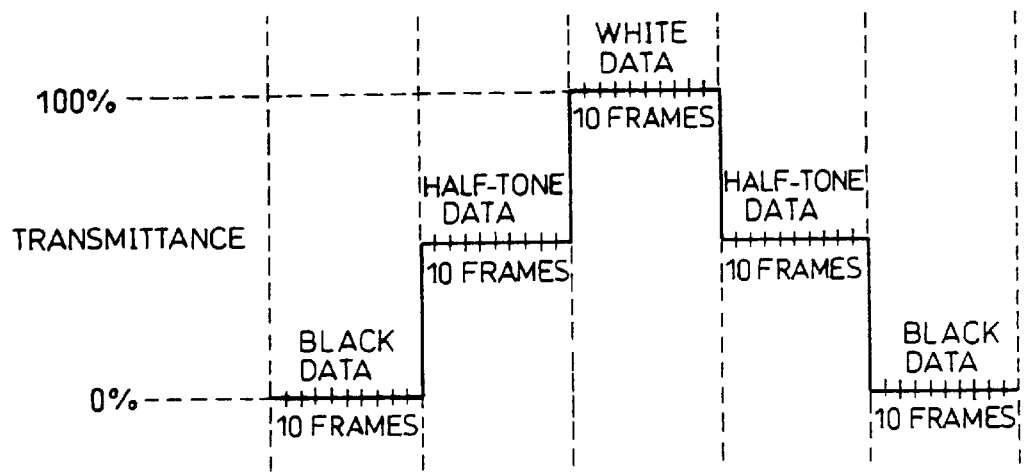
FIG. 15(a) is a graph illustrating an optical response characteristic which ferroelectric liquid crystal exhibits as a data signal changes, in the case display history does not occur.
Figure 15B:
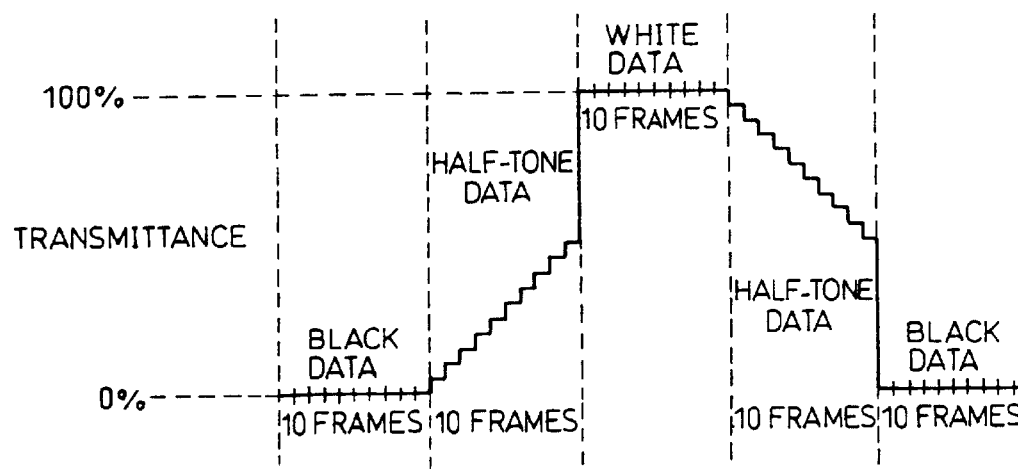
FIG. 15(b) is a graph illustrating an optical response characteristic which ferroelectric liquid crystal exhibits as a data signal changes, in the case where display history occurs.

Variation of quantity of light transmitted through a fourth cell thus produced when the strobe signal and the data signal used in the example 1 were applied is shown in FIG. 13. This figure clearly illustrates that display during a period while half-tone data are displayed was seldom affected by display history of a previous period. Besides, in the half-tone state, emergence of further finer domains (at intervals of 10 μm each) than those in the case of the first cell in Example 1 (see FIG. 11) was confirmed as shown in FIG. 14. This ensures that more gradual gray variation with more gray levels in number can be realized as the voltage applied to the liquid crystal varies. Therefore, it is possible to improve the digital-type abrupt threshold characteristic of the conventional ferroelectric liquid crystal to an analog-type gradual threshold characteristic. This ensures that high-performance half-tone display is realized.

EXAMPLE 3

A liquid crystal cell of the present example was produced in the following manner.

First, the electrodes 3 and 4 made of ITO were formed on the substrates 1 and 2, respectively, to a thickness of 1000 Å each, and the insulating films 5 and 6 were formed by spin coating to a thickness of 700 Å each. For the formation of the insulating films 5 and 6, the substrates 1 and 2 were coated with an insulating-film-use solution by spin coating, and thereafter, the coated substrates 1 and 2 were subjected to prebaking on a hot plate at a temperature of 60° C. for 3 minutes, then main baking at a temperature of 200° C. for 90 minutes. Further, the substrates 1 and 2 were subjected to supersonic washing with use of neutral detergent. Intermediate substrates were thus obtained. This process so far is identical to the cell producing process of Example 1. The following step of causing the intermediate substrates to absorb a substance with ionic bond is an aspect which differs the cell production in the present example from the cell production in Example 1.

As the step of causing the intermediate substrates to absorb the substance with ionic bond, either a step A or a step B was carried out in the present example. The step A is a step of soaking the intermediate substrates in an isopropyl alcohol solution with 1.0 wt % of TBATFMS, and thereafter spinning the intermediate substrates by a spinner so that the intermediate substrates are dried up. On the other hand, the step B is a step of applying an isopropyl alcohol solution with 1.0 wt % of TBATFMS to the intermediate substrates by spin coating or roll coating, and thereafter drying the intermediate substrates by use of a hot plate. Note that here the spin coating method was used for the application of the solution.

Six sample cells #1 through #6 were produced through six different cell producing processes, respectively, which, as shown in Table 1 below, differed in the timing when the step of causing the intermediate substrates to absorb the substance with ionic bond (the step A or B) was performed as well as in the type of the step. More specifically, the sample cells #1 and #2 were produced by conducting the steps A and B, respectively, before the alignment film formation step. The sample cells #3 and #4 were produced by conducting the steps A and B, respectively, between the alignment film formation step and the rubbing step. The sample cells #5 and #6 were produced by conducting the steps A and B, respectively, between the rubbing step and the rubbing washing step (washing step after rubbing).

For formation of the alignment films 7 and 8, an alignment film material made of soluble polyimide was applied to the insulating films 5 and 6 to a thickness of 500 Å by spin coating, and prebaking was carried out on a hot plate at a temperature of 80° C. for 3 minutes, and main baking, at a temperature of 180° C. for 90 minutes. The mixing of a substance with ionic bond into the alignment film material like in the case of Example 1 was not conducted. The rubbing step and the bonding step were carried out under the same respective conditions as those for the same steps for Example 1, and consequently six types of empty cells were obtained. By injecting the FLC material used for the first through third cells of Example 1 into these empty cells, the sample cells #1 through #6 were finished.

Here, as a result of applying to the sample cells #1 through #6 the strobe signal and the data signal used in Example 1, it was confirmed that the sample cells #1 through #6 exhibit optical response characterized in that display during a period while half-tone data are displayed is not affected by display history of a previous period as shown in FIG. 10(*a*), like in the first cell of Example 1.

EXAMPLE 4

A liquid crystal mixture which is obtained by adding the aforementioned polymer or fine particles into an FLC material identical to that sealed in the sample cells #1 through #6 was injected into empty cells corresponding to the sample cells #1 through #6, whereby six sample cells different from the sample cells #1 through #6 were produced.

As a result of application of the aforementioned strobe signal and data signal to the sample cells, emergence of very fine domains was confirmed in the half-tone state, like in the case of the fourth cell of Example 2 (see FIG. 14). This ensures that more gradual gray variation with more gray levels in number can be obtained as the voltage applied to the liquid crystal varies. Therefore, it is possible to improve the digital-type abrupt threshold characteristic of the conventional ferroelectric liquid crystal to an analog-type gradual threshold characteristic. This ensures that high-performance half-tone display is realized.

As described above, in the cases of Examples 3 and 4, the substance with ionic bond is infiltrated either through surfaces of the insulating films 5 and 6 or through surfaces of the alignment films 7 and 8 before or after the rubbing

TABLE 1

| SAMPLE NUMBER | | | PROCESS | | | |
|---|---|---|---|---|---|---|
| #1 | STEP A | ALIGNMENT FILM FORMATION | | RUBBING | RUBBING WASHING | BONDING |
| #2 | STEP B | ALIGNMENT FILM FORMATION | | RUBBING | RUBBING WASHING | BONDING |
| #3 | | ALIGNMENT FILM FORMATION | STEP A | RUBBING | RUBBING WASHING | BONDING |
| #4 | | ALIGNMENT FILM FORMATION | STEP B | RUBBING | RUBBING WASHING | BONDING |
| #5 | | ALIGNMENT FILM FORMATION | | RUBBING | STEP A RUBBING WASHING | BONDING |
| #6 | | ALIGNMENT FILM FORMATION | | RUBBING | STEP B RUBBING WASHING | BONDING | operation, unlike in the cases of Examples 1 and 2 where the substance with ionic bond is mixed in material used for formation of the alignment films 7 and 8. This causes ions to homogeneously disperse throughout the liquid crystal layer 11. Consequently the influence of display history is drastically reduced, resulting in that gray scale display with not less than two gray levels can be stably conducted.

Furthermore, in the present example, as described above, either the step A or B is conducted at any desirable one of the three stages, resulting in that either the step A or B is conducted at an optimal stage in the manufacturing process.

As has been described above, the liquid crystal display element of the present invention includes (i) a pair of substrates 1 and 2 with an insulating property on each of which electrodes 3 and 4 are formed, (ii) at least either of alignment films 7 and 8 provided on at least one of the substrates 1 and 2 so as to cover the electrodes 3 and 4, and (iii) a liquid crystal layer 11 made of a ferroelectric liquid crystal material sealed between the substrates 1 and 2, and is arranged so that the alignment film 7 and 8 are made of an alignment film material containing a substance with ionic bond.

With the foregoing arrangement, since the substance with ionic bond is previously mixed in the alignment films 7 and 8, ions from the alignment films 7 and 8 are solved into the liquid crystal layer 11, thereby becoming homogeneously dispersed in the liquid crystal layer 11. Therefore, during the intermediate display, such ions promote formation of fine domains in the liquid crystal layer 11, as well as cause remarkable reduction of influences of display history of a previous period. Therefore, gray scale display with not less than two gray levels can be stably carried out.

Furthermore, as described above, a liquid crystal display element includes (i) a pair of substrates 1 and 2 with an insulating property on each of which electrodes 3 and 4 are formed, (ii) at least either of alignment films 7 and 8 provided on at least one of the substrates 1 and 2 so as to cover the electrodes 3 and 4, and (iii) a liquid crystal layer 11 made of a ferroelectric liquid crystal material sealed between the substrates 1 and 2, and is arranged so that the alignment films 7 and 8 are caused to have the substance with ionic bond in the vicinity of the surface or inside thereof, by either soaking the substrates 1 and 2 into a solution of the substance with ionic bond or applying the solution onto the substrates 1 and 2, either before formation of the alignment films 7 and 8 on the substrates 1 and 2, after formation of the alignment films 7 and 8 on the substrates 1 and 2, or after an alignment operation conducted with respect to the alignment films 7 and 8 after formation thereof.

With the foregoing arrangement, the substance with ionic bond is not contained in the alignment films 7 and 8, but the substance with ionic bond is directly or indirectly adhered to the alignment films 7 and 8 at any one of the foregoing stages. As a result, the substance is infiltrated into the alignment films 7 and 8. Then, ions are eluted from the alignment films 7 and 8 into the liquid crystal layer 11, thereby becoming homogeneously dispersed in the liquid crystal layer 11. In result, during half-tone display, fine domains are formed, while influences of display history of a previous period are drastically reduced. Therefore, gray scale display with not less than two gray levels can be stably conducted.

Furthermore, as described above, the ferroelectric liquid crystal material preferably has a gradual threshold characteristic with respect to a transmittance varying with a liquid-crystal-applied voltage. By using such ferroelectric liquid crystal material having a gradual threshold characteristic, multiscale display can be easily realized.

Furthermore, as described above, the ferroelectric liquid crystal material contains polymer or fine particles. With this arrangement, fine domains are easily obtained. Therefore, analog-type gray scale display can be realized.

Furthermore, as described above, the ferroelectric liquid crystal material preferably exhibits negative dielectric anisotropy. With the use of the ferroelectric liquid crystal material, if a pulse signal applied thereto is arranged so as to have a constant pulse width, a non-switching region can be set on both the low voltage side and the high voltage side, while a switching region can be set between the non-switching regions. With this arrangement, by using the non-switching region on the high voltage side, stability of the non-switched state (holding state) is enhanced, resulting in that leakage of light is reduced and hence contrast is improved.

Furthermore, as described above, the alignment films 7 and 8 are preferably formed on both the substrates 1 and 2, respectively, and a uniaxial aligning operation in one and same direction is preferably applied to both of the alignment films 7 and 8. This makes the smectic layers composed of liquid crystal molecules in the liquid crystal layer 11 bent in a uniform direction, whereby the C1 orientation or the C2 orientation is obtained. Therefore, gray scale display taking advantages of the characteristics of the C1 or C2 orientation can be carried out.

Furthermore, as described above, each liquid crystal molecule in the liquid crystal layer 11 preferably tilts toward a side on which smectic layers constituting the liquid crystal layer 11 are bent, or in other words, the C2 orientation is preferable. In the case of the C2 orientation, liquid crystal molecules in the smectic layers in the vicinity of the substrates 1 and 2 never move, or hardly move, since they are affected by the interfaces between the substrates 1 and 2 and the smectic layers. For this reason, in the smectic layers, only the liquid crystal molecules that are located at portions except for the portions in the vicinity of the interfaces move, and therefore, it is possible to increase the switching speed. As a result, an FLC display element with a high response speed can be provided.

As described above, a method of the present invention for producing a liquid crystal display element having a pair of substrates 1 and 2 with an insulating property (including insulating films 5 and 6) on each of which electrodes are formed, at least one of alignment films 7 and 8 provided on at least one of the substrates 1 and 2 so as to cover the electrodes 3 and 4, and a liquid crystal layer 11 made of a ferroelectric liquid crystal material sealed between the substrates 1 and 2 is arranged so as to have the steps of (i) mixing a substance with ionic bond in an alignment film material for forming the alignment films 7 and 8, (ii) applying, by roll coating, spin coating, or the like, the alignment film material to at least one of the paired substrates 1 and 2 so as to form the alignment films 7 and 8, and (iii) bonding the substrates 1 and 2 to each other after the mixing and applying steps, and injecting the ferroelectric liquid crystal material between the bonded substrates 1 and 2.

By the foregoing method, since a substance with ionic bond is previously mixed in an alignment film material, the alignment films 7 and 8 formed by application of the alignment film material to the substrates contain the substance with ionic bond. Therefore, this method enables production of a liquid crystal display element provided with the alignment films 7 and 8 containing the substance with ionic bond, without complicated steps. Thus, it is possible to easily provide a liquid crystal display element whose gray scale display characteristics are remarkably improved.

As described above, another method of the present invention for producing liquid crystal element having a pair of substrates 1 and 2 with an insulating property on each of which electrodes 3 and 4 are formed, at least one of alignment films 7 and 8 provided at least on one of the substrates 1 and 2 so as to cover the electrodes 3 and 4, and a liquid crystal layer 11 made of a ferroelectric liquid crystal material sealed between the substrates 1 and 2 is arranged so as to have the steps of (i) either soaking the substrates 1 and 2 into a solution of a substance with ionic bond or applying the solution to the substrates 1 and 2, either before formation of the alignment films 7 and 8, after formation of the alignment films 7 and 8, or after application of an aligning operation with respect to the alignment films 7 and 8 already formed, and (ii) bonding the substrates 1 and 2 to each other after the forgoing step and injecting the ferroelectric liquid crystal material between the bonded substrates 1 and 2.

By the foregoing method, since the substrates 1 and 2 are soaked into a solution of a substance with ionic bond or the solution is applied to the substrates 1 and 2 at any one of the foregoing stages, the substance with ionic bond is infiltrated into the alignment films 7 and 8 already formed. This ensures that in the case where the substance with ionic bond is not contained in an alignment film material, the solution of the substance is applied to the alignment films 7 and 8 through any step other than the alignment film formation step, resulting in that the substance with ionic bond is infiltrated into the formed alignment films 7 and 8. Therefore, by the method, without complicated steps, a liquid crystal display element with at least an alignment film 7 or 8 which contains a substance with ionic bond in the vicinity of the surface or inside thereof can be produced simply by soaking the substrates 1 and 2 into the solution or applying the solution to the substrates 1 and 2 at a desired stage. As a result, it is possible to provide a liquid crystal display device whose gray scale display characteristics are remarkably improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element comprising a pair of substrates with an insulating property on each of which electrodes are formed, an alignment film provided on at least one of said substrates so as to cover said electrodes, and a liquid crystal layer made of a ferroelectric liquid crystal material sealed between said substrates, wherein said alignment film contains a substance with ionic bond in a vicinity of surface or inside thereof;

said substance with ionic bond is a salt; and a quantity of said substance with ionic bond is not less than 0.1 percent by weight with respect to said ferroelectric liquid crystal material.

2. The liquid crystal display element as set forth in claim 1, wherein said alignment film is formed with use of an alignment film material containing said substance with ionic bond.

3. The liquid crystal display element as set forth in claim 2, wherein said alignment film is formed by baking said alignment film material containing said substance with ionic bond.

4. The liquid crystal display element as set forth in claim 1, wherein said alignment film is caused to have said substance with ionic bond in a vicinity of surface or inside thereof, by either soaking said substrates into a solution of said substance with ionic bond or applying said solution onto said substrates, either before formation of said alignment film on said substrates, after formation of said alignment film on said substrates, or after an alignment operation conducted with respect to said alignment film after formation thereof.

5. The liquid crystal display element as set forth in claim 1, wherein said ferroelectric liquid crystal material has a gradual threshold characteristic with respect to a transmittance varying with a voltage applied to said liquid crystal layer.

6. The liquid crystal display element as set forth in claim 5, wherein said ferroelectric liquid crystal material contains polymer or fine particles.

7. The liquid crystal display element as set forth in claim 1, wherein the ferroelectric liquid crystal material exhibits negative dielectric anisotropy.

8. The liquid crystal display element as set forth in claim 7, wherein said ferroelectric liquid crystal material exhibits a voltage vs. memory-pulse width characteristic which has a minimum value, upon application of a pulse voltage.

9. The liquid crystal display element as set forth in claim 1, wherein said alignment film is formed on a surface of each of said substrates, and a uniaxial aligning operation in one and same direction is applied to both of said alignment films.

10. The liquid crystal display element as set forth in claim 9, wherein each liquid crystal molecule in said liquid crystal layer tilts at narrower angles with respect to smectic layers which are bent to form the chevron structure and which constitute said liquid crystal layer.

11. The liquid crystal display element as set forth in claim 1, wherein said substance with ionic bond is a substance which is soluble in said ferroelectric liquid crystal material so as to be dissolved into ions.

12. The liquid crystal display element as set forth in claim 1, wherein said alignment film is made of polyimide containing said substance with ionic bond.

13. The liquid crystal display element as set forth in claim 12, wherein said alignment film is formed by baking a solution of soluble polyimide containing said substance with ionic bond.

* * * * *